US005612872A

United States Patent [19]

Fujita

[11] Patent Number: 5,612,872

[45] Date of Patent: Mar. 18, 1997

[54] MACHINE TRANSLATION SYSTEM

[75] Inventor: Kimikazu Fujita, Moriguchi, Japan

[73] Assignee: Matsushita Electric Industrial Co., Ltd., Osaka, Japan

[21] Appl. No.: 420,571

[22] Filed: Apr. 12, 1995

[30] Foreign Application Priority Data

Apr. 13, 1994 [JP] Japan .................................... 6-074810

[51] Int. Cl.$^6$ .................................................... G06F 17/28

[52] U.S. Cl. .......................... 395/752; 395/755; 395/757

[58] Field of Search ......................... 364/419.02, 419.05, 364/419.07, 419.08, 419.11, 419.14, 419.16; 395/144

[56] References Cited

U.S. PATENT DOCUMENTS

| | | | |
|---|---|---|---|
| 4,460,973 | 7/1984 | Tanimoto et al. | 364/419.06 |
| 5,020,021 | 5/1991 | Kaji et al. | 364/419.05 |
| 5,523,946 | 6/1996 | Kaplan et al. | 364/419.02 |
| 5,541,837 | 7/1996 | Fushimoto | 364/419.02 |

FOREIGN PATENT DOCUMENTS

| | | |
|---|---|---|
| 63-47877 | 2/1988 | Japan . |
| 5108712 | 4/1993 | Japan . |

*Primary Examiner*—Jeffery Hofsass
*Assistant Examiner*—Andrew Hill
*Attorney, Agent, or Firm*—Price, Gess & Ubell

[57] ABSTRACT

A machine translation device translates an original sentence written in a source language into a translated sentence written in a target language, and includes an input device for inputting the original sentence; original sentence analysis device for dividing the original sentence into single words and for analyzing syntactic structure of the original sentence; a translation dictionary for storing related words of a same meaning in at least three languages including the source language and the target language; dictionary reference means for referencing the translation dictionary and, when it finds an appropriate word in the target language corresponding to a word in the original sentence, for retrieving the word in the target language, while when there is no appropriate word in the target language, for retrieving a word in a predetermined language aside from the source language which corresponds to a word in the original sentence from the translation dictionary as an untranslated word; and translated sentence generation means for converting every word in the syntactic structure of the original sentence into words in the target language and untranslated words and, by using the syntactic structure in which every word has been converted, for generating the translated sentence.

20 Claims, 18 Drawing Sheets

[SPECIFIED LANGUAGE DISPLAY]

| ORIGINAL SENTENCE | TRANSLATED SENTENCE |
|---|---|
| J'ai achéte du pain. | I bought I(pane). |
| Once billetes de ida de segunda clase pura Toledo, por favor. | I(undici) second class one way tickets for Toledo, please. |
| | |

FIGURE 2(a) RELATED ART

| ORIGINAL SENTENCE | TRANSLATED SENTENCE |
| --- | --- |
| 私はパンを買った。 | I bought パン. |

FIGURE 2(b) RELATED ART

| ORIGINAL SENTENCE | TRANSLATED SENTENCE |
| --- | --- |
| J'ai achéte du pain. | I bought pain |

FIGURE 6

| | JAPANESE | CHINESE | ENGLISH | GERMAN | FRENCH | ITALIAN | SPANISH |
|---|---|---|---|---|---|---|---|
| | 1 | 2 | 3 | 4 | 5 | 6 | 7 |
| 1 | パン | 面包 | | Brot | pain | pane | pan |
| 2 | 砂糖 | 糖 | sugar | Zucker | sucre | zucchero | azúcar |
| 3 | 支払う | | pay | zahlen | payer | pagare | pagar |
| 4 | 水 | 涼水 | water | Wasser | eau | acqua | agua |
| 5 | | | country | | | | |
| 6 | | | | | | | |

| ROMANIC LANGUAGES | GERMANIC LANGUAGES | SLAVONIC LANGUAGES | FINNIC LANGUAGES | . . . . |
|---|---|---|---|---|
| SPANISH | SWEDISH | RUSSIAN | ESTONIAN | . |
| CATALAN | DANISH | UKRAINIAN | FINNISH | . |
| PORTUGUESE | NORWEGIAN | POLISH | LAPP | . |
| FRENCH | GAELIC | CZECH | HUNGARIAN | . |
| ITALIAN | ENGLISH | SLOVAKIAN | : | |
| RUMANIAN | GERMAN | SERBO-CROAT | | |
| SARDINIAN | DUTCH | BULGARIAN | | |
| : | : | MACEDONIAN | | |
| | | : | | |

(SOURCE:The New Encyclopedia Britannia, 15th Edition, Vol 22, P659, Encyclopedia Britannia, Inc., 1990.)

FIGURE 8

| BUFFER NAME | STORED INFORMATION |
|---|---|
| R0 | COLUMN NUMBER IN TRANSLATION DICTIONARY |
| R | COLUMN NUMBER FOR TARGET LANGUAGE |
| G | ROW NUMBER IN TRANSLATION DICTIONARY |
| YAKUGO | TRANSLATED WORD |
| KIGOU | DISPLAY LANGUAGE IDENTIFICATION CODE |
| SG | LANGUAGE INDICATION |

FIGURE 9

| 1 | 2 | 3 | 4 | 5 | 6 | 7 |
|---|---|---|---|---|---|---|
| JAPANESE | CHINESE | ENGLISH | GERMAN | FRENCH | ITALIAN | SPANISH |
| J | C | E | G | F | I | S |

FIGURE 13
(a) 私はパンを買った。
(b) 私 は パン を 買う た。
(c)
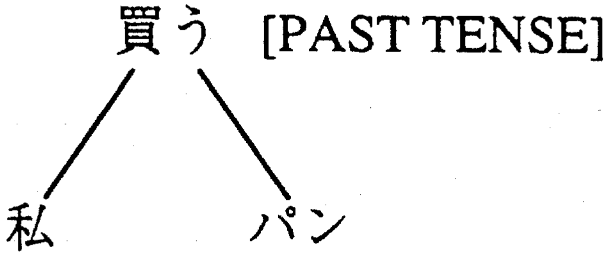
(d)
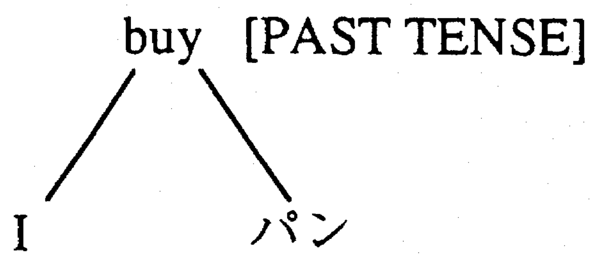
(e) I bought J(パン).

FIGURE 14

「SOURCE LANGUAGE DISPLAY」

| ORIGINAL SENTENCE | TRANSLATED SENTENCE |
| --- | --- |
| J'ai achéte du pain. | I bought F(pain). |
| Once billetes de ida de segunda clase pura Toledo, por favor. | S(once) second class one way tickets for Toledo, please. |
| 私はパンを買った。 | I bought J(パン). |

FIGURE 15

「SPECIFIED LANGUAGE DISPLAY」

| ORIGINAL SENTENCE | TRANSLATED SENTENCE |
|---|---|
| J'ai achéte du pain. | I bought I(pane). |
| Once billetes de ida de segunda clase pura Toledo, por favor. | I(undici) second class one way tickets for Toledo, please. |
| | |

FIGURE 16

[SAME LANGUAGE FAMILY DISPLAY]

| ORIGINAL SENTENCE | TRANSLATED SENTENCE |
|---|---|
| J'ai achéte du pain. | I bought S(pan). |
| Once billetes de ida de segunda clase pura Toledo, por favor. | I(undici) second class one way tickets for Toledo, please. |
| | |

FIGURE 17

| ORIGINAL SENTENCE | TRANSLATED SENTENCE |
| --- | --- |
| F(J'ai achéte du pain.) | E(I bought S(pan).) |
| S(Once billetes de ida de segunda clase pura Toledo, por favor.) | E(I(undici) second class one way tickets for Toledo, please.) |
| | |

FIGURE 18

| ORIGINAL SENTENCE | | TRANSLATED SENTENCE | |
|---|---|---|---|
| F | J'ai achéte du pain. | E | I bought S(pan). |
| S | Once billetes de ida de segunda clase pura Toledo, por favor. | E | I(undici) second class one way tickets for Toledo, please. |
| | | | |

MACHINE TRANSLATION SYSTEM

BACKGROUND OF THE INVENTION

1. Field of the Invention

The present invention relates to a machine translation system which translation is automatically performed by a computer, and especially to a machine translation system which includes an untranslated word processing function for effectively assisting the checking process for translation between many languages.

2. Description of the Related Art

The principle construction for machine translation systems under the prior art is shown by the block diagram in FIG. 1. The translation dictionary 130 in the illustrated machine translation system stores words of a same meaning corresponded for two languages, for example, English and Japanese, or French and English. Therefore, during the translation process, the translation unit 120 first divides the source language sentence (hereafter referred to as the original sentence) stored in the text storage unit 110 into separate words, and gets the syntactic structure of the sentence by using the grammar rules of the source language, before looking each of the words up in the translation dictionary 130. Next, it retrieves the words in the target language (hereafter referred to as translated words) from the translation dictionary 130 which are the equivalents of the words in the original sentence. Next, by using the syntactic structure, the retrieved translated words, and the appropriate translation grammar rules, it obtains the syntactic structure in the target language, and generates sentences in the target language by using the generation rules (hereafter referred to as the translated sentence). The generated translated sentence is then displayed alongside the original sentence on the screen of the display device 140. The user then checks the translated sentence with the original sentence displayed on the screen and then has the process move on to the translation process for the next sentence.

However, there are cases, when translating between languages, when it is unclear as to which translated word to use, or when there is no equivalent word in the target language. Since there is no entry in a column set in the translation dictionary 130 for such translated words, the reference process for the translated word will end in failure. In such a case, machine translation systems under the related art are designed so as to insert the word in the source language for which the reference process was a failure into the translated sentence which is then displayed.

FIG. 2 is a drawing showing an example of the translation displayed on the screen by a machine translation system under the related art. FIG. 2(*a*) shows an example of translation from Japanese to English, while FIG. 2(*b*) shows an example of translation from French to English. Both cases show a hypothetical example where there is no English translation for a word in the original text [the word "パン" in Japanese, "pain in French"]. As a result, it can be seen in FIG. 2(*a*) that the original Japanese word "パン" has been inserted. In the same way, it can be seen in FIG. 2(*b*) that the original French word "pain" has bean inserted. It should be noted at this point that the choice of these words has been made purely for ease of understanding of the process, since a recognized translated word, "bread", does actually exist in the English language.

However, it is not always the case that tho user will have sufficient understanding of the source language in the original sentence. If the user does not have much understanding of the source language in the original sentence, then there may be the following problem. For the example shown in FIG. 2(*a*), should the user not possess much understanding of the Japanese in the original sentence, then even if the untranslated word "パン" is displayed in Japanese to the user, then the user may not be able to understand the meaning of the untranslated word and so, as a result, may not understand the meaning of the translated sentence. In the same way, for the example shown in FIG. 2(*b*), should the user not possess much understanding of the French in the original sentence, then even if the untranslated word "pain" is displayed in French to the user, then the user may not be able to understand the meaning of the translated sentence.

SUMMARY OF THE INVENTION

In view of the problems described above, it is the object of the present invention to provide a machine translation system and a machine translation method whereby, even if there are untranslated words, it will be easy to understand the meaning of such untranslated words.

The above object can be achieved by a machine translation system for translating an original sentence written in a source language into a translated sentence written in a target language, comprising: an input unit for inputting the original sentence; an original sentence analysis unit for dividing the original sentence into single words and for analyzing syntactic structure of the original sentence; a translation dictionary for storing related words of a same meaning in at least three languages including the source language and the target language; a dictionary reference unit for referencing the translation dictionary and, when it finds an appropriate word in the target language corresponding to a word in the original sentence, for retrieving the word in the target language, while when there is no appropriate word in the target language, for retrieving a word in a predetermined language aside from the source language which corresponds to a word in the original sentence from the translation dictionary as an untranslated word; and a translated sentence generation unit for converting every word in the syntactic structure of the original sentence into words in the target language and untranslated words and, by using the syntactic structure in which every word has been converted, for generating the translated sentence.

By means of the above construction, since a word in a predetermined language is taken from the translation dictionary as an untranslated word when there is no word in the target language which is the equivalent of a word in the original sentence, the meaning of untranslated words can be more easily understood, so that the checking process can be more effectively executed.

Also, the machine translation device may further comprise a language name specification reception unit for receiving a specification from a user for a name of a language for untranslated words, wherein the dictionary reference unit, when there is no appropriate word in the target language, retrieves from the translation dictionary a word in a specified language specified by the name of the language received by the language name specification reception unit which corresponds to a word in the original sentence as an untranslated word.

By means of the above construction, since a specification of a language which can be understood by the user is received beforehand, since a word in the specified language is taken from the translation dictionary as an untranslated word when there is no word in the target language which is the equivalent of a word in the original sentence, the meaning of untranslated words can be more easily understood, so that the checking process can be more effectively executed.

Also, the machine translation device may further comprise a language family dictionary for classifying at least three languages included in the translation dictionary into language families of languages with a high degree of similarity, and for storing every language classified into a language family to which it belongs, wherein the dictionary reference unit, when there is no appropriate word in the specified language for a word in the original sentence, references the language family dictionary and selects a certain language out of a language family which includes the specified language and retrieves from the translation dictionary a word in the certain language which corresponds to a word in the original sentence as an untranslated word.

By means of the above construction, since the language family dictionary is referenced and a language similar to the specified language is used when there is no word in the specified language which is the equivalent of a word in the original sentence, then a language which has a high probability of being understood by the user is used for untranslated words, so that the checking process can be more effectively executed.

Also, when the dictionary reference unit retrieves from the translation dictionary the word in the certain language which corresponds to the word in the original sentence as the untranslated word, it may also retrieve a name of the certain language, and the translated sentence generation unit may convert every word in the syntactic structure of the original sentence into words in the target language and untranslated words retrieved by the dictionary reference unit and, by using the syntactic structure in which every word has been converted and a language identification code for identifying the name of the certain language for the untranslated words retrieved by the dictionary reference unit, may generate the translated sentence with the language identification codes added to the untranslated words.

By means of the above construction, since language identification codes for untranslated words are added to untranslated words in the translated sentence, misunderstandings by the user of the language of the words used as untranslated words can be avoided, so that the words generated by machine translation can be easily checked.

As the other aspect, the present invention relates to the process described as a machine translation method for translating an original sentence written in a source language into a translated sentence written in a target language, using a translation dictionary which stores related words in at least three languages including the source language and the target language, comprising: an input step in which the original sentence is inputted; an original sentence analysis step in which single words in the original sentence are identified and syntactic structure of the original sentence is analyzed; a dictionary reference step in which the translation dictionary is referenced, and, when an appropriate word in the target language corresponding to a word in the original sentence is found, the word in the target language is retrieved, while when there is no appropriate word in the target language, a word in a predetermined language aside from the source language which corresponds to a word in the original sentence is retrieved from the translation dictionary as an untranslated word; and a translated sentence generation step in which every word in the syntactic structure of the original sentence is converted into words in the target language and untranslated words, and, by using the syntactic structure in which every word has been converted, the translated sentence is generated.

By means of the above process, since a word in a predetermined language is taken from the translation dictionary as an untranslated word when there is no word in the target language which is the equivalent of a word in the original sentence, the meaning of untranslated words can be more easily understood, so that the checking process can be more effectively executed.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 2 is a drawing showing an example of a screen displayed by a machine translation system under the related art;

FIG. 6 is a drawing showing an example of the content of the translation dictionary for the machine translation system shown in FIG. 3;

FIG. 7 is a drawing showing an example of the content of the language family dictionary for the machine translation system shown in FIG. 3;

FIG. 8 is a drawing showing the content of the storage information of the buffer memory for the machine translation system shown in FIG. 3;

FIG. 9 is a table showing the abbreviations for the language identification codes for words to be translated;

FIG. 13 is a drawing showing the state of the character string at every stage ((a)–(e)) of the translation process in the flowchart shown in FIG. 10;

FIG. 14 is a drawing showing an example of a screen displayed as the result of the translation process of the machine translation system of the present invention;

FIG. 15 is a drawing showing an example of a screen displayed as the result of the translation process of the machine translation system of the present invention;

FIG. 16 is a drawing showing an example of a screen displayed as the result of the translation process of the machine translation system of the present invention;

FIG. 17 is a drawing showing an example of a screen displayed as the result of the translation process of the machine translation system of the present invention;

FIG. 18 is a drawing showing an example of a screen displayed as the result of the translation process of the machine translation system of the present invention.

DESCRIPTION OF THE PREFERRED EMBODIMENT

The following is an explanation of the embodiment of the present invention with reference to the drawings.

Figure 1:
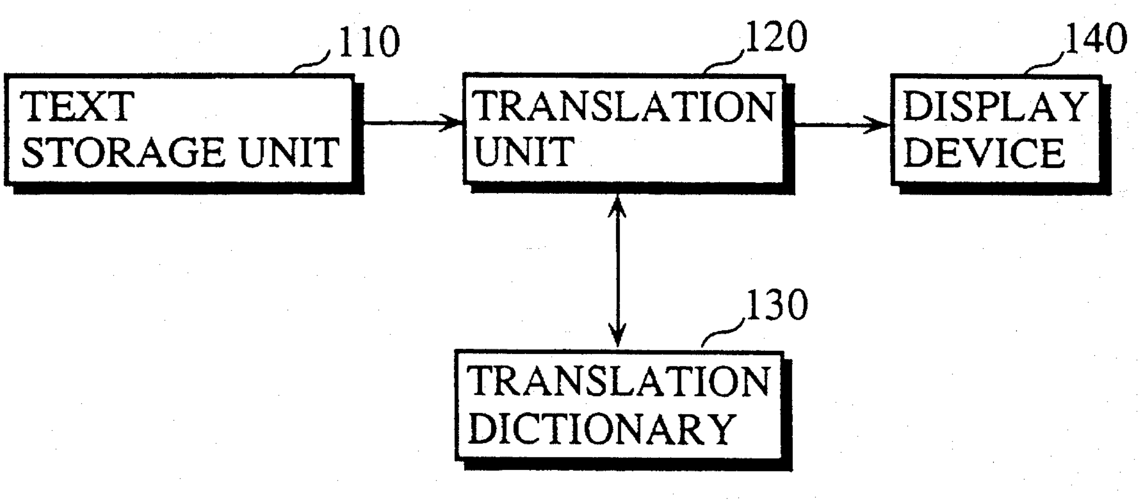
FIG. 1 is a block drawing showing the principle construction of a machine translation system under the related art.
Figure 3:
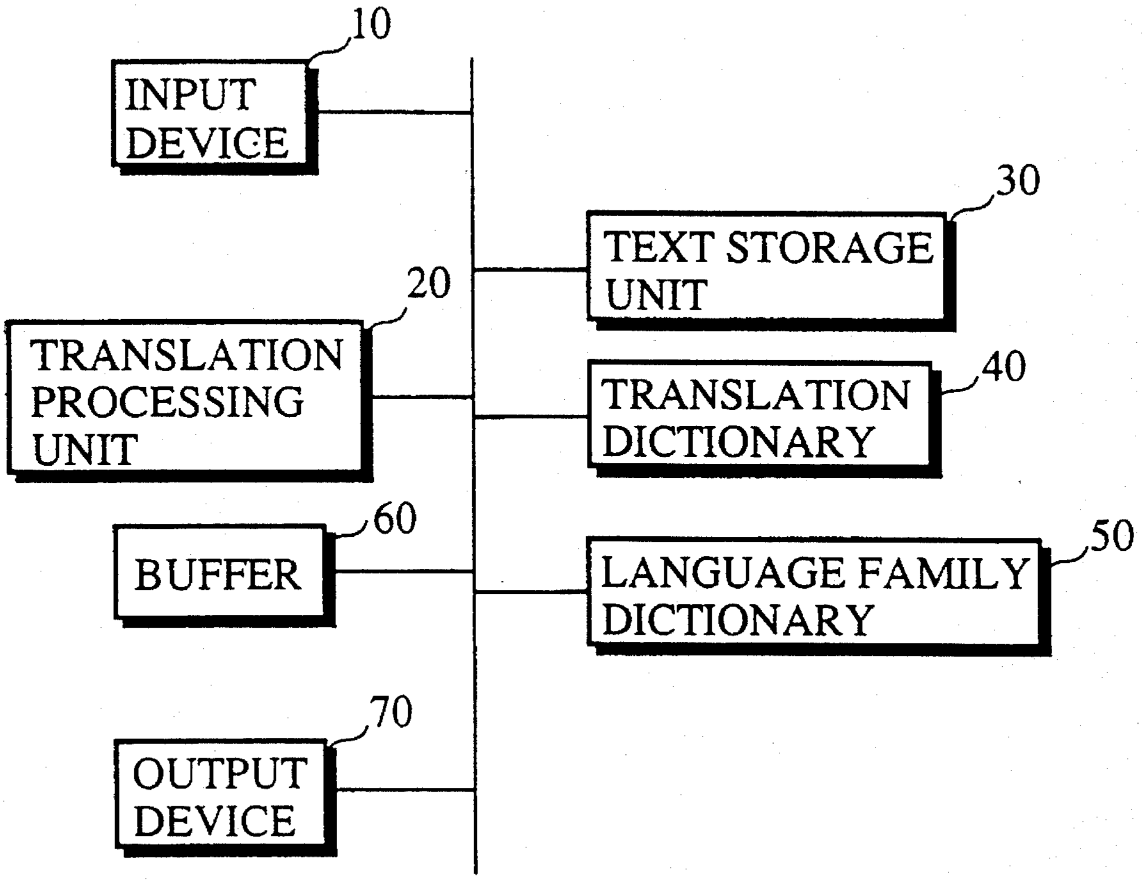
FIG. 3 is a construction of a machine translation system according to the embodiment of the present invention.
Figure 4:
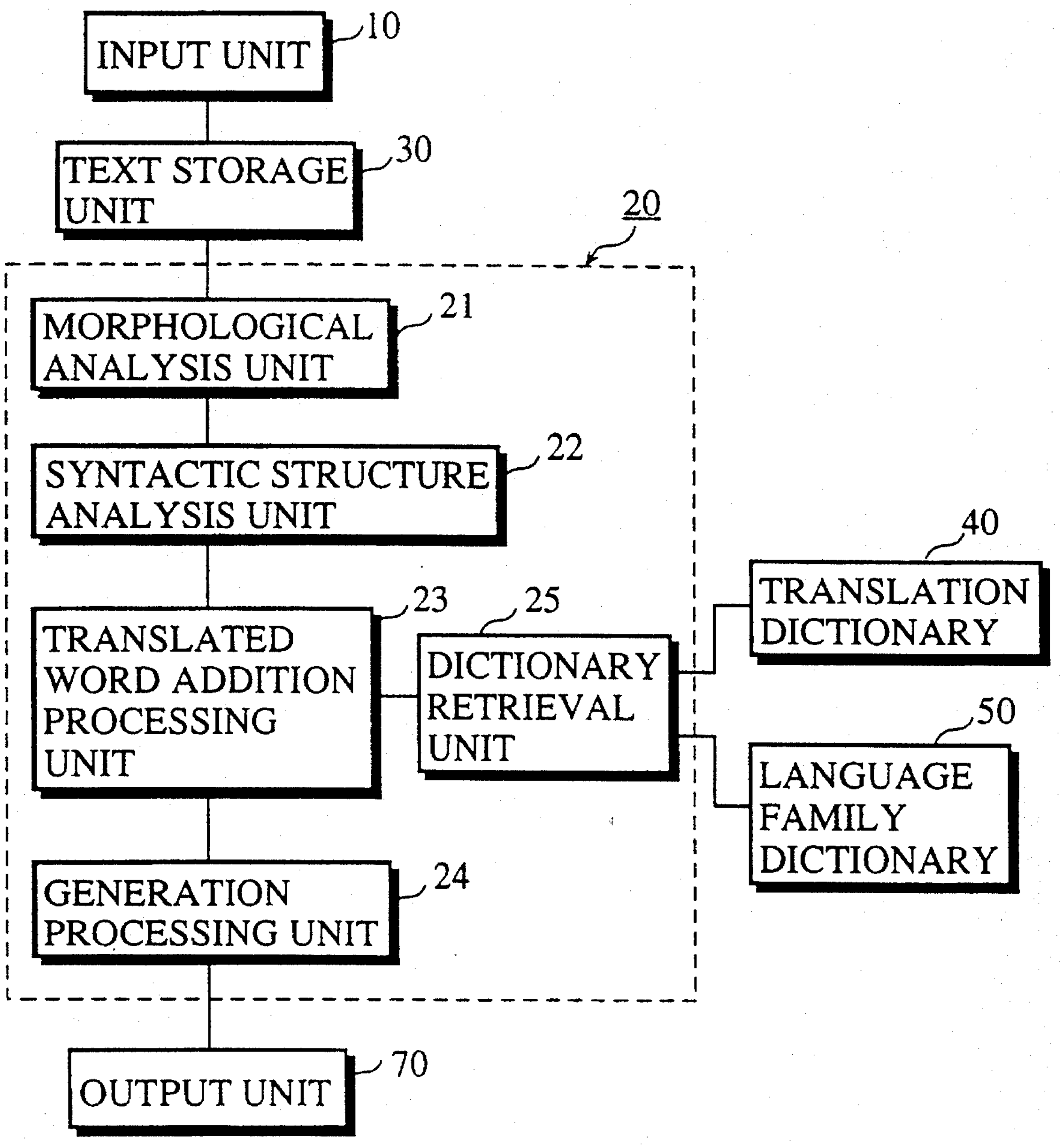
FIG. 4 is a block diagram showing the translation processing unit for the machine translation system according to the present embodiment divided into function blocks.

FIG. 3 is a construction of a machine translation system according to the embodiment of the present invention, while FIG. 4 is a block diagram wherein the machine translation system shown in FIG. 3 is divided into function blocks. The machine translation system according to this embodiment is comprised of an input device 10, a translation processing unit 20, a text storage unit 30, a translation dictionary 40, a language family dictionary 50, a buffer 60, and an output device 70.

The input device 10 is composed of a keyboard or suchlike and is used for inputting the sentences in the source language (original sentences). Also, the input device 10 may be constructed so as to receive a direct input from a recording medium storing original sentences or from another text generation device which generates original sentences. Additionally, when there is a untranslated word, the input device 10 receives an input of information indicating the display language for displaying the untranslated word. The display language indication information is stored in the language indication buffer SG described below.

The translation processing unit 20 is realized by a translation program whose operation is controlled by the CPU. Its construction and operation are described below.

Figure 5:
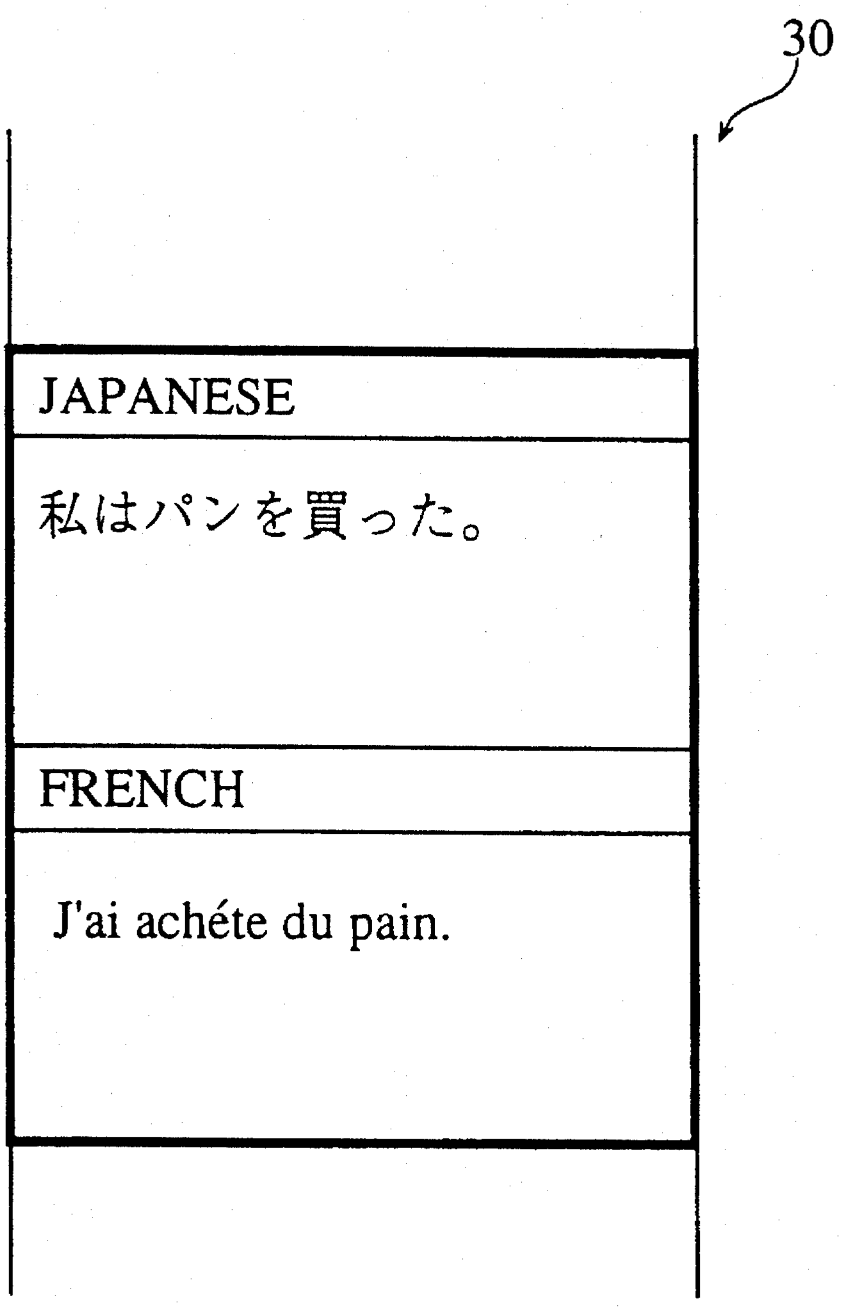
FIG. 5 is a drawing showing the model of the storage state of the text storage unit of the machine translation system shown in FIG. 3.
Figure 10:
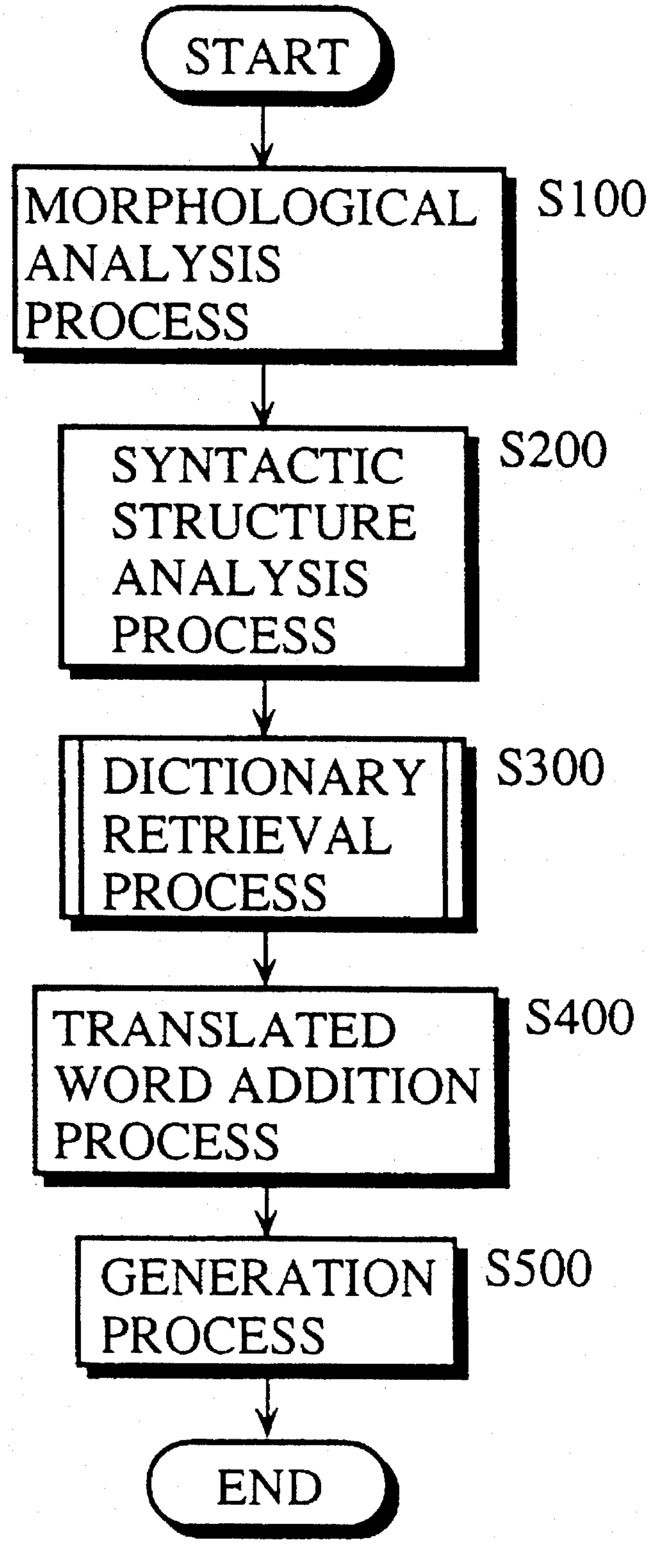
FIG. 10 is a flowchart showing the operation performed by the machine translation system shown in FIG. 3.

The text storage unit 30 is composed of a storage device such as a hard disc, or memory, and stores the original sentences inputted via the input device 10. A model showing the storage state of the text storage unit 30 is given in FIG. 5. As shown in the drawing, the text storage unit 30 stores each original sentence separately, with the name of the language for the original sentence written at the top of the column.

The translation dictionary 40 is constructed from a storage medium such as a hard disc device, a floppy disc device, a magnetic storage device or an optical storage device, and stores dictionary data including a multi-language dictionary construction in which words of a same meaning are corresponded between several languages. An example of such is shown in FIG. 6. In this translation dictionary 40, different languages are arranged into R columns, with words having a same meaning in different languages arranged into G rows. For the example of the English word "water", the translations in the different languages are stored in each of the columns (R=1, 2, . . . ) in the fourth row (G=4). Note that blank entries in this table denote that there is no equivalent word in the language for that column. As a result, when such a blank entry is retrieved during the retrieval of translated words, then the word in the source language for which the retrieval process is being executed is then processed as an untranslated word. It should be noted that the blank entries in the drawing have been prepared so as to assist the explanation of the operation of the present embodiment and do not reflect the absence in reality of such a word in the language concerned.

The language family dictionary 50, in the same way as the translation dictionary 40, is composed of a hard disc device or similar, and stores the language family information for a number of different languages classified by the family of languages to which they belong. An example of the language family information in the language family dictionary 50 is shown in FIG. 7. Families of languages are groups of languages classified as being closely related in terms of their evolution, so that there are similarities between words and structure of languages which belong to the same family of languages. For example, as can be seen from FIG. 6, the German word "Wasser" closely resembles the English word "water", while there are also strong similarities between the French word "eau", the Italian word "acqua" and the Spanish word "agua". This is because, as can be seen in FIG. 7, English and German both belong to the Germanic family of languages, while French, Italian and Spanish all belong to the Romanic family of languages. Accordingly, since the words in different languages within the same language family tend to closely resemble one another, it can be said that there is a high degree of understanding between such languages. The translation process described below makes use of this property of languages and is designed so as to use a word from a different language in a same language family when there is no word available in the target language.

The buffer 60 is constructed as a memory for temporary storage to be used during the retrieval process for the translated word and is made up of 6 kinds of storage areas, these being, SG, R0, R, G, YAKUGO, and KIGOU). The content of the data stored in each of these storage areas is shown in FIG. 8. The language indication buffer SG stores the identification information for the display language for the untranslated word which is inputted into the input device 10 as described above. The content of the data stored in the other storage areas is described below at an appropriate point in the explanation of the translated word retrieval process.

The display device 70 is constructed from a CRT, a liquid crystal display device or suchlike, and displays translated sentences alongside the original sentences on a screen.

The translation processing unit 20, as shown in FIG. 4, shows the different functions divided into blocks. The following is an explanation of the operation of the translation processing unit 20 with reference to FIGS. 10 to 13.

First, the morphological analysis unit 21 retrieves one at a time the original sentences stored in the text storage unit 30 and, referring when necessary to the word dictionary (not illustrated), divides the original sentence up into single words (S100). An example of an original sentence is shown in FIG. 13(*a*), while FIG. 13(*b*) shows the state of the same sentence after the morphological analysis has been performed.

Next, the syntactic structure analysis unit 22 determines the syntactic structure of the original sentence based on the interrelationships between the morphemes and grammatical information for the source language (S200). An example of the determined syntactic structure is shown in FIG. 13(*c*) in the form of a tree structure. Each word in the tree structure is called a node, with the part of speech information for the word and the link information with regard to the other nodes or the language identification information being stored for each node. Additionally, the translated word addition processing unit 23 receives the syntactic structure of the original sentence and executes the process selecting the translated word in the target language for each of the words contained in the original sentence. The translated word addition processing unit 23 outputs the language names of the source language and the target language, as well as the words in the source language taken from the syntactic structure to the dictionary retrieval unit 25.

Figure 11:
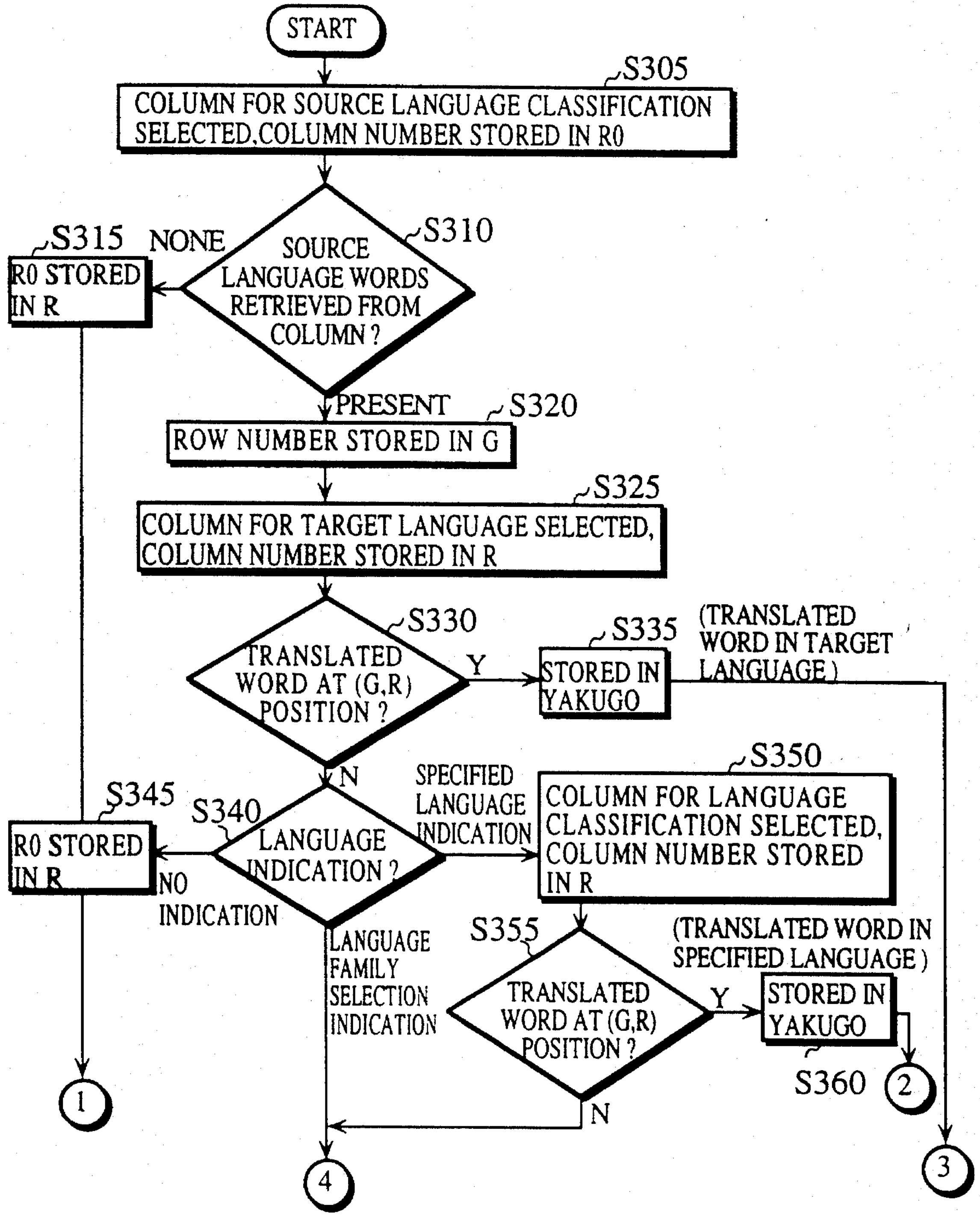
FIG. 11 is a sub-flowchart for the operation of the dictionary referencing process in the flowchart shown in FIG. 10.
Figure 12:
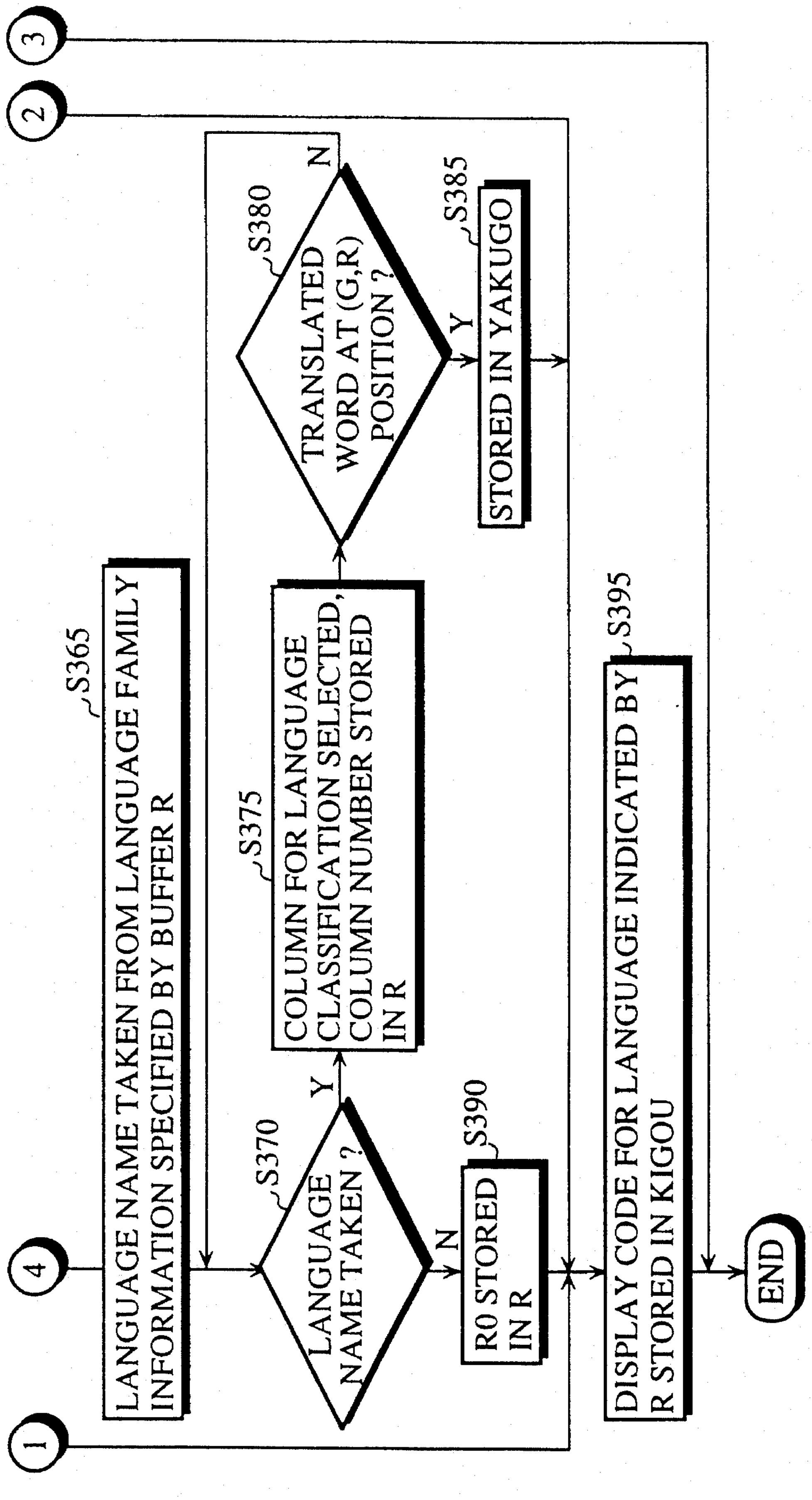
FIG. 12 is a sub-flowchart for the operation of the dictionary referencing process in the flowchart shown in FIG. 10.

It can be seen from FIGS. 11 and 12 that the dictionary retrieval unit 25 references the translation dictionary 40 based on the language name of the source language and retrieves the column for the source language out of all of the columns for the different languages in the translation dictionary 40, storing the column number for this language in the buffer R0 (S305).

Additionally, words stored in the retrieved column are retrieved as the retrieval key for each word in the source language and a corresponding word is referenced. If a corresponding word is found, then the column number for this word is stored in the buffer G (S320). If the retrieval is unsuccessful, then the content of the buffer R0 (column number for the source language) is stored in the buffer R in order to show that there is no corresponding word in the source language in the translation dictionary (S315).

Next, the dictionary retrieval unit 25 retrieves the language column in the translation dictionary 40 using the target language as the retrieval key and stores the column number of the appropriate language in the buffer R (S325). Once the column for the target language has been found, then the row position in which the translated word for the original word is stored is read from the buffer G where it is already stored, and the translated word in the target language is found. If such a translated word is present, then it is stored in the buffer YAKUGO (S330, S335), while, if there is none present, the process described below is performed (S330).

When the retrieval of the translated word is unsuccessful, it is necessary to display the untranslated word in the translated sentence which is the translation result. The following is a description of three kinds of untranslated word determination processes which can be executed alternatively.

(Display of the Untranslated Word in the Source Language)

The dictionary retrieval unit 25 refers to the buffer SG and judges whether there is an indication of the display language for an untranslated word (S340). If language indication information is not inputted, then the first display format of source language display is selected for untranslated words. As a result, the content of the buffer R0 is stored in the buffer R (S345).

(Specified Language Display of Untranslated Words)

If there is a language indication, then as the second display format for untranslated words, a retrieval process for displaying words in a specified different language in place of untranslated words is performed. The dictionary retrieval unit 25 then retrieves the language column in the translation dictionary for the specified language retrieved from the buffer SG and stores the column number for the column corresponding to the specified language in the buffer R (S350).

Next, the storage position in the translation dictionary 40 specified by the row number stored in the buffer G and the column number stored in the buffer R is consulted and it is determined whether there is a translated word present (S355). If there is a translated word in the specified language, then this translated word is stored in the buffer YAKUGO (S360). The translated word stored in the buffer YAKUGO is then displayed in the translated sentence as a display word representing the untranslated word.

(Display of untranslated word in a language in a selected family of languages)

If, once again, there is no translated word present (S340), then as the third display format for untranslated words, a word retrieval process for displaying words in a different language in the same language family in place of untranslated words is performed. During this process, the buffer R stores the language name information for either the target language for which translated word retrieval was unsuccessful (S330, S340), or the specified language for which translated word retrieval was unsuccessful (S340, S350, S355). The dictionary retrieval unit references the language family dictionary 50 based on the language name information stored in the buffer R and finds the language family to which the language (either the target language or the specified language) stored in the buffer R belongs (S365).

Once the language family has been specified, a language for displaying the untranslated word is selected out of the languages in the appropriate language family according to a predetermined arrangement. Procedures, such as the selection of the language stored after the object language in the same language family, or the selection of the language stored at the top of the column of the same language family, or the selection of any random language in the same language family can be set as the selection arrangement.

If the retrieval of the language from the language family dictionary 50 is unsuccessful, then the content of the buffer R0 is stored in the buffer R (S390).

Once a language has been retrieved from the language family dictionary 50, then the corresponding column for this language in the translation dictionary is retrieved and the column number of this language column is stored in the buffer R (S375). Next, the storage position in the translation dictionary 40 specified by the row number stored in the buffer G and the column number stored by the buffer R is referenced and it is determined whether a translated word is present (S380). If there is such a word, then the word is stored in the buffer YAKUGO (S385). If there is no such word, then a different language is selected from the same language family and the above translated word selection process is repeated (S370, S375, S380).

By means of the processes described above, translated words or, by means of one of the three methods described above, untranslated words are stored in the buffer YAKUGO. Also, the translated word addition processing unit 23, based on the information for the target language or the information for the language used for the untranslated words, stores a code for the appropriate language name from the translated word display code data in the buffer KIGOU (S395).

The above process is executed for every word in the syntactic structure of the original sentence.

Next, the translated word addition processing unit 23 retrieves the information obtained from the above process for the translated words and the untranslated words from the buffer YAKUGO and replaces the words in the syntactic structure in the source language with the translated words and the untranslated words, as well as adding the abbreviated symbols for the language names which are retrieved from the buffer KIGOU. By executing this process it generates the syntactic structure for the target language (S400). An example of the syntactic structure for the target language is shown in FIG. 13(*d*). As shown for this syntactic structure, the word "パン" is untranslated, and an example where it is selected so as to be shown in the source language is given in the drawing.

Hereafter, the generation processing unit 24 generates the target sentence for the syntactic structure, based on the grammar rules for the target language and the sentence generation rules (S500). An example of the target sentence is given in FIG. 13(*e*). Here, the untranslated word "パン" is displayed in the source language (Japanese) along with the language code [J] showing that it is a Japanese word.

The following is an explanation with reference to the example displays in FIGS. 14 through 18, to the three possible display modes in the machine translation system the present embodiment for untranslated words.

1. Display of Untranslated Words in the Source Language Mode

FIG. 14 shows an imaginary example when translating from French, Spanish and Japanese into English, so that the untranslated words are displayed in the source language, which the respective source language being indicated by an appropriate abbreviation, F for French, S for Spanish and J for Japanese, and the words being displayed in parenthesis, so that the words F(pain), S(once), and J(パン) are displayed in the respective sentences.

2. Display of Untranslated Words in a Specified Language Chosen by an Input of Indication Information Mode When the system is operating so that Italian is used as the specified language when a translated word in the target language cannot be found, a display such as I(pane), I(undici) in FIG. 15 is displayed. By clearly displaying the untranslated word and a code showing the language name to the user in this way, a translation result which can be more easily understood is obtained.

3. Display of Untranslated Words Using a Language Out of the Language Family Dictionary Mode Also, for the imaginary example shown in FIG. 16, if the display language for the untranslated word is Italian, then when there is no translated word in Italian for the French word [pain], then Spanish is selected out of the same language family (as Italian) and the display S(pan) is inserted into the translated sentence. If the user understands Italian, then the word [pan] in Spanish, a language in the same language family, can be thought of as being readily understandable.

In this way, the machine translation system of the above embodiment allows for the selection of one of source language display, specified language display, and language family display for untranslated words and, by also giving language code showing the name of the display language, provides for the easy identification of the presence of untranslated words, as well as clearly displaying the untranslated words themselves.

It should be noted that in the selection process of the language in the same language family (S365) in the above embodiment, the case where the language family for the target language is described, although the system may also be designed so as to allow the selection of a display language out of the same language family as the source language. Under such an arrangement, the dictionary retrieval unit 25 references the language family dictionary 50 using the name of the source language.

Also, as a variation of the above embodiment, as shown in FIG. 17, the system may be designed so as to display a code for the language name for each entire translated sentence in the translated text, or, as shown in FIG. 18, may be designed so as include areas for displaying the language name for each translated sentence. By using such a display, then the translated results can be viewed easily, even when there are a number of different languages mixed in the same text.

Also, in the above embodiment, words are displayed using predetermined language codes with the untranslated words being displayed in curved parenthesis, although it is possible for the user to change the codes as desired and for the untranslated words to be displayed using a different color or a different font to the rest of the text.

Additionally, in the above embodiment the translation dictionary is described as being composed of a table including information for a number of languages, but such a translation dictionary should not be construed as being limited to such, and may also be constructed of a number of bi-lingual dictionaries, with these bi-lingual dictionaries being cross-referenced so that referencing of the equivalent words in a number of languages in a chain is possible for a word, so that the same effect can be achieved as the above embodiment.

Finally, the above embodiment gives an example where a screen display is used, but the system may also be designed so as to write the information into an external file for storage purposes.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A machine translation device for translating an original sentence written in a source language into a translated sentence written in a target language, comprising:

input means for inputting the original sentence;

original sentence analysis means for dividing the original sentence into single words and for analyzing syntactic structure of the original sentence;

a translation dictionary for storing related words of a same meaning in at least three languages including the source language and the target language;

dictionary reference means for referencing the translation dictionary and, when it finds an appropriate word in the target language corresponding to a word in the original sentence, for retrieving the word in the target language, while when there is no appropriate word in the target language, for retrieving a word in a predetermined language aside from the source language which corresponds to a word in the original sentence from the translation dictionary as an untranslated word; and translated sentence generation means for converting every word in the syntactic structure of the original sentence into words in the target language and untranslated words and, by using the syntactic structure in which every word has been converted, for generating the translated sentence.

2. The machine translation device of claim 1, further comprising language name specification reception means for receiving an specification from a user for a name of a language for untranslated words, wherein the dictionary reference means, when there is no appropriate word in the target language, retrieves from the translation dictionary a word in a specified language specified by the name of the language received by the language name specification reception means which corresponds to a word in the original sentence as an untranslated word.

3. The machine translation device of claim 2, further comprising a language family dictionary for classifying at least three languages included in the translation dictionary into language families of languages with a high degree of similarity, and for storing every language classified into a language family to which it belongs, wherein the dictionary reference means, when there is no appropriate word in the specified language for a word in the original sentence, references the language family dictionary and selects a certain language out of a language family which includes the specified language and retrieves from the translation dictionary a word in the certain language which corresponds to a word in the original sentence as an untranslated word.

4. The machine translation device of claim 3, wherein when the dictionary reference means retrieves from the translation dictionary the word in the certain language which corresponds to the word in the original sentence as the untranslated word, it also retrieves a name of the certain language, and the translated sentence generation means converts every word in the syntactic structure of the original sentence into words in the target language and untranslated words retrieved by the dictionary reference means and, by using the syntactic structure in which every word has been converted and a language identification code for identifying the name of the certain language for the untranslated words retrieved by the dictionary reference means, generates the translated sentence with the language identification codes added to the untranslated words.

5. The machine translation device of claim 4, further comprising display means, including a display screen, for displaying the translated sentences generated by the translated sentence generation means on the display screen, with any untranslated words in the translated sentence being displayed in a different way to the words in the target language.

6. The machine translation device of claim 3, further comprising display means, including a display screen, for displaying the translated sentences generated by the translated sentence generation means on the display screen, with any untranslated words in the translated sentence being displayed in a different way to the words in the target language.

7. The machine translation device of claim 2, wherein when the dictionary reference means retrieves from the translation dictionary a word in the specified language which corresponds to a word in the original sentence as an untranslated word, it also retrieves the name of the specified language, and the translated sentence generation means converts every word in the syntactic structure of the original sentence into words in the target language and untranslated words retrieved by the dictionary reference means, and by using the syntactic structure in which every word has been converted and a language identification code for identifying the specified language for the untranslated words retrieved by the dictionary reference means, generates the translated sentence with the language identification codes added to the untranslated words.

8. The machine translation device of claim 7, further comprising further comprising display means, including a display screen, for displaying the translated sentences generated by the translated sentence generation means on the display screen, with any untranslated words in the translated sentence being displayed in a different way to the words in the target language.

9. The machine translation device of claim 2, further comprising further comprising display means, including a display screen, for displaying the translated sentences generated by the translated sentence generation means on the display screen, with any untranslated words in the translated sentence being displayed in a different way to the words in the target language.

10. The machine translation device of claim 1, further comprising a language family dictionary for classifying at least three languages included in the translation dictionary into language families of languages with a high degree of similarity, and for storing every language classified into a language family to which it belongs, wherein the dictionary reference means, when there is no appropriate word in the specified language for a word in the original sentence, references the language family dictionary and selects a certain language out of a language family which includes the specified language and retrieves from the translation dictionary a word in the certain language which corresponds to a word in the original sentence as an untranslated word, wherein the dictionary reference means, when there is no appropriate word in the target language, references the language family dictionary and selects a certain language out of a language family which includes one of the target language and the source language, and retrieves from the translation dictionary a word in the certain language which corresponds to a word in the original sentence as an untranslated word.

11. The machine translation device of claim 10, wherein when the dictionary reference means retrieves from the translation dictionary the word in the certain language which corresponds to the word in the original sentence as the untranslated word, it also retrieves a name of the certain language, and the translated sentence generation means converts every word in the syntactic structure of the original sentence into words in the target language and untranslated words retrieved by the dictionary reference means and, by using the syntactic structure in which every word has been converted and a language identification code for identifying the name of the certain language for the untranslated words retrieved by the dictionary reference means, generates the translated sentence with the language identification codes added to the untranslated words.

12. The machine translation device of claim 11, further comprising display means, including a display screen, for displaying the translated sentences generated by the translated sentence generation means on the display screen, with any untranslated words in the translated sentence being displayed in a different way to the words in the target language.

13. The machine translation device of claim 10, further comprising further comprising display means, including a display screen, for displaying the translated sentences generated by the translated sentence generation means on the display screen, with any untranslated words in the translated sentence being displayed in a different way to the words in the target language.

14. The machine translation device of claim 1, wherein when the dictionary reference means retrieves from the translation dictionary a word in the predetermined language which corresponds to a word in the original sentence as an untranslated word, it also retrieves a name of the predetermined language, and the translated sentence generation means converts every word in the syntactic structure of the original sentence into words in the target language and untranslated words retrieved by the dictionary reference means, and by using the syntactic structure in which every word has been converted and a language identification code for identifying a name of the predetermined language for the untranslated words retrieved by the dictionary reference means, generates the translated sentence with the language identification codes added to the untranslated words.

15. The machine translation device of claim 14, further comprising display means, including a display screen, for displaying the translated sentences generated by the translated sentence generation means on the display screen, with any untranslated words in the translated sentence being displayed in a different way to the words in the target language.

16. The machine translation device of claim 1, further comprising display means, including a display screen, for displaying the translated sentences generated by the translated sentence generation means on the display screen, with any untranslated words in the translated sentence being displayed in a different way to the words in the target language.

17. A machine translation method for translating an original sentence written in a source language into a translated sentence written in a target language, using a translation dictionary which stores related words in at least three languages including the source language and the target language, comprising:

an input step in which the original sentence is inputted;

an original sentence analysis step in which single words in the original sentence are identified and syntactic structure of the original sentence is analyzed;

a dictionary reference step in which the translation dictionary is referenced, and, when an appropriate word in the target language corresponding to a word in the original sentence is found, the word in the target language is retrieved, while when there is no appropriate word in the target language, a word in a predetermined language aside from the source language which corresponds to a word in the original sentence is retrieved from the translation dictionary as an untranslated word; and a translated sentence generation step in which every word in the syntactic structure of the original sentence is converted into words in the target language and untranslated words, and, by using the syntactic structure in which every word has been converted, the translated sentence is generated.

18. The machine translation method of claim 17, further comprising a language name specification reception step, preceding a translation process, in which a specification from a user for a name of a language for untranslated words is received, wherein in the dictionary reference step, when there is no appropriate word in the target language, a word in a specified language specified by the name of the language received by the language name specification reception step which corresponds to a word in the original sentence is retrieved from the translation dictionary as an untranslated word.

19. The machine translation method of claim 18, also using a language family dictionary classifying at least three languages included in the translation dictionary in terms of language families for languages with a high degree of similarity and storing every language classified into a language family to which it belongs, wherein in the dictionary reference step, when there is no appropriate word in the specified language for a word in the original sentence, the language family dictionary is referenced and a certain language out of a language family which includes the specified language is selected, and a word in the certain language which corresponds to a word in the original sentence is retrieved from the translation dictionary as an untranslated word.

20. The machine translation method of claim 17, also using a language family dictionary classifying at least three languages included in the translation dictionary in terms of language families for languages with a high degree of similarity and storing every language classified into a language family to which it belongs, wherein in the dictionary reference step, when there is no appropriate word in the target language, a certain language in a same language family as one of the target language and a source language is selected, and a word in the certain language which corresponds to a word in the original sentence is retrieved from the translation dictionary as an untranslated word.

* * * * *